United States Patent
Cottin et al.

(10) Patent No.: US 12,423,516 B2
(45) Date of Patent: Sep. 23, 2025

(54) RECOMMENDATION GENERATION USING MACHINE LEARNING MODEL TRAINED ON MULTI-STEP PERFORMANCE DATA

(71) Applicant: SAP SE, Walldorf (DE)

(72) Inventors: Pierre Cottin, Paris (FR); Martin Dufour, Paris (FR); Martin Tournier, Paris (FR)

(73) Assignee: SAP SE, Walldorf (DE)

( * ) Notice: Subject to any disclaimer, the term of this patent is extended or adjusted under 35 U.S.C. 154(b) by 436 days.

(21) Appl. No.: 17/993,236

(22) Filed: Nov. 23, 2022

(65) Prior Publication Data
US 2024/0169146 A1    May 23, 2024

(51) Int. Cl.
G06F 40/194    (2020.01)
G06Q 10/1053   (2023.01)

(52) U.S. Cl.
CPC ....... *G06F 40/194* (2020.01); *G06Q 10/1053* (2013.01)

(58) Field of Classification Search
CPC .... G06F 40/194; G06F 40/30; G06Q 10/1053
See application file for complete search history.

(56) References Cited

U.S. PATENT DOCUMENTS

| 6,687,596 | B2 | 2/2004 | Humerickhouse et al. |
| 8,219,356 | B2 | 7/2012 | Mihok et al. |
| 9,379,951 | B2 | 6/2016 | Mihnev |
| 9,842,110 | B2 * | 12/2017 | Braziunas ............... G06F 16/93 |
| 10,831,841 | B2 | 11/2020 | Grover et al. |
| 2012/0271593 | A1 | 10/2012 | Uluyol et al. |

(Continued)

FOREIGN PATENT DOCUMENTS

| CN | 109214719 A | 1/2019 |
| CN | 109493001 A | 3/2019 |

(Continued)

OTHER PUBLICATIONS

De Andrade Vieira, Rodrigo J. et al., "Power Curve Modelling of a Wind Turbine for monitoring its behaviour", 2015 4th International Conference on Renewable Energy Research and Applications (ICRERA), Nov. 22, 2015, (pp. 1052-1057, 6 total pages).

*Primary Examiner* — Bhavesh M Mehta
*Assistant Examiner* — Philip H Lam
(74) *Attorney, Agent, or Firm* — Buckley, Maschoff & Talwalkar LLC

(57) ABSTRACT

Systems and methods include reception of a first post comprising text, identification of one or more prior posts similar to the first post from a plurality of prior posts based on the text of the first post and text of the plurality of prior posts, determination, for each identified one or more prior posts, of probabilities associated with each of two or more posting platforms, for each of the identified one or more posts, determination of a weighted probability associated with each of two or more posting platforms based on a similarity of the post to the first post and the probabilities associated with each of two or more posting platforms for the post, determination of one or more of the two or more posting platforms based on the weighted probabilities, and transmission of the first post to the determined one or more posting platforms.

17 Claims, 10 Drawing Sheets

(56) References Cited

U.S. PATENT DOCUMENTS

| | | | | |
|---|---|---|---|---|
| 2013/0046704 | A1* | 2/2013 | Patwa | G06Q 10/06 |
| | | | | 705/321 |
| 2016/0356859 | A1 | 12/2016 | Harding et al. | |
| 2018/0335019 | A1 | 11/2018 | Knudsen et al. | |
| 2019/0138970 | A1 | 5/2019 | Deutsch et al. | |
| 2021/0065094 | A1* | 3/2021 | Mathiesen | G06Q 10/06398 |
| 2021/0127150 | A1* | 4/2021 | Alagarsamy | H04L 67/131 |
| 2022/0058587 | A1* | 2/2022 | Medicke | G06F 16/906 |
| 2022/0067665 | A1* | 3/2022 | Westerheide | G06N 20/00 |
| 2023/0077840 | A1* | 3/2023 | Wu | G06N 5/022 |
| | | | | 706/12 |
| 2023/0252419 | A1* | 8/2023 | Stewart | G06N 20/00 |
| | | | | 705/321 |
| 2023/0325778 | A1* | 10/2023 | Stewart | G06N 7/023 |
| | | | | 705/321 |

FOREIGN PATENT DOCUMENTS

| | | |
|---|---|---|
| CN | 109522329 A | 3/2019 |
| EP | 3343300 A1 | 4/2018 |
| EP | 3734523 A1 | 4/2020 |
| KR | 20210025276 A | 3/2021 |

\* cited by examiner

| ID | Post Text |
|---|---|
| 1 | *We're looking for...* |
| 2 | *Your role will be...* |

FIG. 3

| ID | $x_1$ | $x_2$ | ... | $x_{300}$ |
|---|---|---|---|---|
| 1 | 1.12 | -0.60 | ... | -0.17 |
| 2 | 0.78 | 1.27 | ... | 0.04 |

FIG. 4

| ID | Distance |
|---|---|
| 1 | 0.34 |
| 2 | 0.91 |
| ... | ... |

FIG. 5

| ID | Distance | Prob$_{P1}$ | Prob$_{P2}$ |
|---|---|---|---|
| 328 | 0.09 | 0.76 | 0.25 |
| 23 | 0.27 | 0.08 | 0.58 |
| 155 | 0.15 | 0.64 | 0.36 |
| 190 | 0.36 | 0.18 | 0.67 |
| 14 | 0.35 | 0.72 | 0.31 |

*FIG. 6*

| Platform | Score | Recommendation |
|---|---|---|
| P1 | 15.56 | Highly Recommended |
| P2 | 10.07 | Recommended |

*FIG. 7*

| ID | x1 | x2 | ... | x300 | P1 – S1 | P1 – S2 | P1 – S3 | P2 – S1 | P2 – S2 | Hired P1? | Hired P2? |
|---|---|---|---|---|---|---|---|---|---|---|---|
| 1 | 1.12 | -0.60 | ... | -0.17 | 32 | 15 | 8 | 47 | 12 | 1 | 0 |
| 2 | 0.78 | 1.27 | ... | 0.04 | 21 | 10 | 4 | 13 | 5 | 0 | 1 |

*FIG. 9*

| ID | x1 | x2 | ... | x300 | P1 – S1 | P1 – S2 | P1 – S3 | P2 – S1 | P2 – S2 | P1 Probability | P2 Probability |
|---|---|---|---|---|---|---|---|---|---|---|---|
| 1 | 1.12 | -0.60 | ... | -0.17 | 32 | 15 | 8 | 47 | 12 | 0.75 | 0.37 |
| 2 | 0.78 | 1.27 | ... | 0.04 | 21 | 10 | 4 | 13 | 5 | 0.23 | 0.58 |

Posting Platform Recommendation

| Platform | Recommendation |
|---|---|
| ☐ P1 | Highly Recommended |
| ☐ P2 | Recommended |
| ☐ P8 | Not Recommended |

1310

[ Post to Selected ]  [ Other Platforms ]
       1320                  1330

*FIG. 13*

RECOMMENDATION GENERATION USING MACHINE LEARNING MODEL TRAINED ON MULTI-STEP PERFORMANCE DATA

BACKGROUND

Modern computing paradigms enable collaboration between disparate entities. Such collaboration may include using a software application operated by one entity to generate data records, and transmitting those data records to other applications operated by other entities for usage thereby.

In one example, a recruiting application may enable a user to create a job requisition, to select multiple third-party job posting platforms (i.e., job boards), and to transmit the job requisition to the selected job boards. Each job board exhibits different characteristics. For example, each job board may be associated with a different fee schedule, demographic distribution of users, user interface, search algorithm, and/or candidate intake process.

In view of the foregoing, it can be difficult to select an appropriate set of job boards to which a job requisition should be transmitted. Selection of an appropriate set of job boards is important, since transmission of a job requisition to a job board which is unlikely to attract suitable candidates unnecessarily increases fees, management overhead and process complexity. Systems are therefore desired for efficiently selecting a set of job boards which are likely to attract a suitable number of appealing candidates at an acceptable cost.

BRIEF DESCRIPTION OF THE DRAWINGS

FIG. 3 depicts text of historical posts according to some embodiments.

FIG. 4 depicts coefficients of vectorized historical posts according to some embodiments.

FIG. 5 depicts, for various historical posts, a distance to a new post and probabilities associated with posting platforms according to some embodiments.

FIG. 6 depicts, for various most-recommended historical posts, a distance to a new post and probabilities associated with posting platforms according to some embodiments.

FIG. 7 illustrates recommendations associated with posting platforms according to some embodiments.

FIG. 9 illustrates training data according to some embodiments.

FIG. 12 illustrates data used to determine recommendation scores according to some embodiments.

FIG. 13 is a view of a user interface to present recommended posting platforms according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments relate to systems which generate recommendations of posting platforms to which a post should be transmitted based on a trained machine learning model. While some examples below are described with respect to job boards (e.g., Monster, Indeed, LinkedIn) and job requisitions, embodiments may be implemented with respect to any type of platform for presenting a post intended to persuade a user to initiate a multi-step process.

Generally, some embodiments train a machine learning model to generate a probability associated with each of a plurality of posting platforms. The model is trained based on numerical representations of prior posts, a number of candidates of each prior post which proceeded to each stage of a process initiated from each posting platform (e.g., a recruiting process), and an indication for each post of the posting platform which resulted in a successful process (e.g., a hired candidate).

The training data of each prior post is submitted to the trained model to determine, for each prior post, a probability associated with each posting platform. Next, a new post is received. The new post is compared to the prior posts to determine a set of most-similar prior posts. A score for each posting platform is then determined based on similarities of the new post to each prior post, and the probability associated with each posting platform for each prior post. One or more posting platforms are determined based on the scores and the post may be transmitted to the one or more determined posting platforms.

Figure 1:
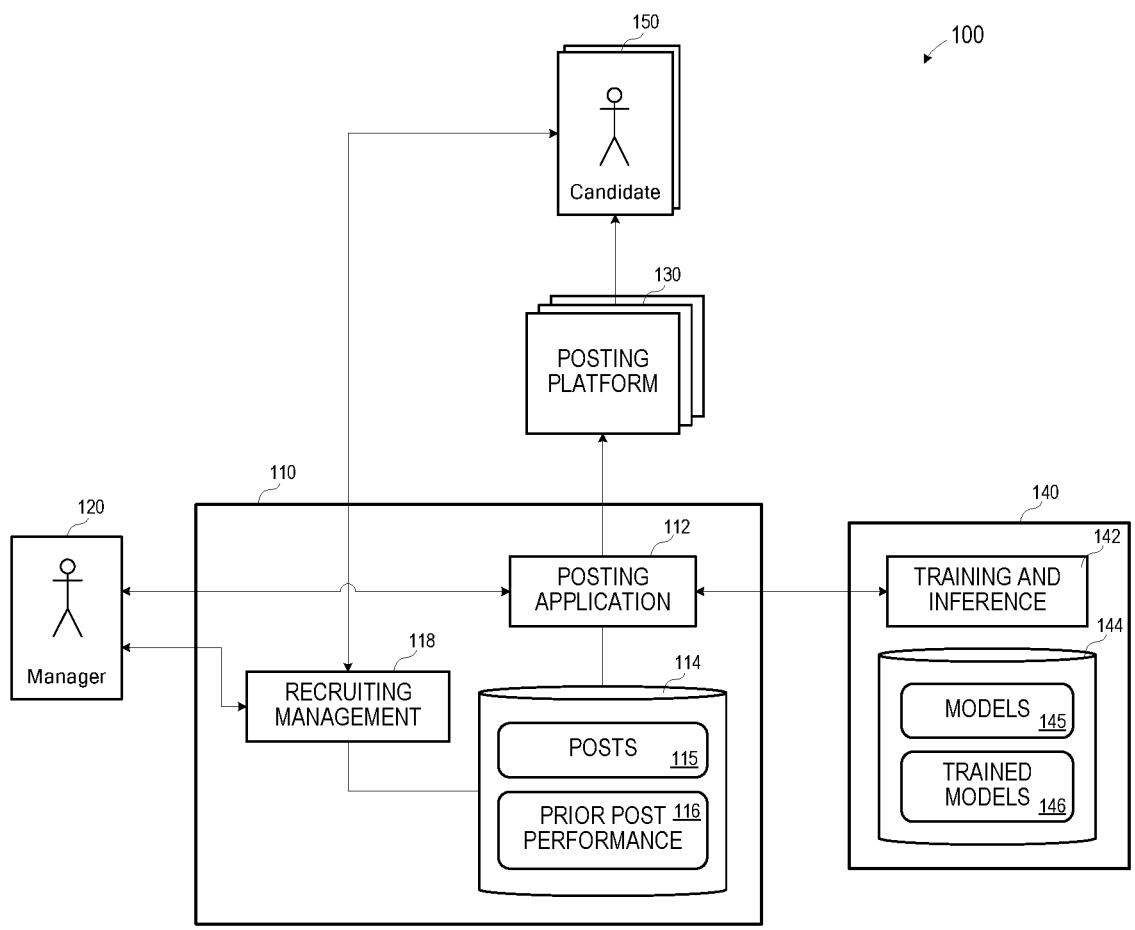
FIG. 1 is a block diagram of an architecture for generating posts and recommending posting platforms and according to some embodiments.

FIG. 1 is a block diagram of an architecture of system 100 according to some embodiments. The illustrated elements of system 100 may be implemented using any suitable combination of computing hardware and/or software that is or becomes known. In some embodiments, two or more elements of system 100 are implemented by a single computing device. Two or more elements of system 100 may be co-located. One or more elements of system 100 may be implemented as a cloud service (e.g., Software-as-a-Service, Platform-as-a-Service). A cloud-based implementation of any elements of system 100 may apportion computing resources elastically according to demand, need, price, and/or any other metric.

Application platform 110 may comprise an on-premise, cloud-based, or hybrid computing platform providing an execution platform and services to software applications. Application platform 110 may comprise one or more virtual machines executing program code of an application server. The software applications may comprise program code executable by one or more processing units (e.g., Central Processing Units (CPUs), processor cores, processor threads) of application platform 110 to provide various functions.

Application platform 110 executes posting application 112. In one example, posting application 112 provides a portal which may be accessed over the Web. Manager 120 accesses the portal, provides suitable credentials and interacts with posting application 112 to create a post. A post may comprise a job requisition but embodiments are not limited thereto.

A job requisition may include text describing a job vacancy to which the job requisition relates. The text may describe attributes such as a job type, a job description, preferred qualifications, job benefits, etc. Created posts may be stored in data store 114 as posts 115. Data store 114 may comprise any suitable storage system such as a database system, which may be partially or fully remote from compute elements of platform 110, and may be distributed as is known in the art.

Manager 120 may also operate posting application 112 to select one or more of posting platforms 130 to receive a post 115. Each of posting platforms 130 may comprise an on-premise, cloud-based or hybrid computing system which accepts posts from posting application 112. In this regard, posting application 112 may be configured to provide a post to a particular posting platform 130 in the format and over the protocol required by the particular posting platform 130.

As will be described in detail below, posting application 112 may communicate with machine learning service 140 to assist the selection of posting platforms 130 to which a given post 115 should be transmitted. Machine learning service 140 may include training and inference component 142 to provide training of one or more selectable models 145 based on data received from posting application 112. Training and inference component 142 also provides inferences generated by resulting trained models 146 based on input data received from posting application 112.

Machine learning service 140 may comprise a cloud-based application server or any suitable computing system, including the same server or system on which application platform 110 resides. Training and inference component 142 may provide APIs which can be called to transmit training data and select a model 145 for training. Training and inference component 142 may also provide APIs which can be called to transmit input data and select a trained model 146.

Each model 145 is associated with respective hyperparameters defining the node layers thereof. Models 145 may be trained based on respective initial node and objective functions using supervised learning algorithms as is known. Trained models 146 may be implemented in program code and may comprise any implementation of a trained machine learning model that is or becomes known.

According to some embodiments, a post 115 transmitted to one of posting platforms 130 may be viewed by candidates such as candidate 150. Posting platforms 130 may communicate posts to candidate 150 in any manner that is or becomes known. For example, candidate 150 may establish a subscription with a posting platform 130 to receive notices (e.g., via e-mail or text) of posts which are associated with certain attributes (e.g., particular location, particular position, particular degree requirement). Candidate 150 may also directly access a posting platform 130, with or without login credentials, to browse posts received thereby.

According to some embodiments, candidate 150 may respond to a post via the posting platform 130 on which the post resides. For example, a posting platform 130 may include a "Send resume and cover letter" hyperlink which candidate 150 may select to upload documents to recruiting management application 118 of platform 110. Recruiting management application 118 may be operated by manager 120 or other human resources personnel to facilitate the organization and review of communications received from candidates.

Recruiting management application 118 may be used to manage a multi-step process associated with candidate 150. For example, recruiting management application 118 may manage a multi-step recruiting process which includes a series of sequential steps. Typically, a candidate 150 advances through the steps until it is determined by the candidate or the manager/human resources personnel to end the recruiting process after a determination that the candidate 150 isn't the right person for the opportunity, after the candidate 150 voluntarily withdraws from the recruiting process, or by offering the candidate 150 the position.

For each initiated recruiting process with a candidate 150, recruiting management application 118 may track the associated post, the posting platform 130 to which the candidate 150 responded in order to initiate the process, and the steps of the recruiting process reached by the candidate 150. For example, recruiting management application 118 tracks whether the candidate 150 was hired to fill the job vacancy associated with the post, a point at which the candidate 150 withdrew from the process, or a point at which the candidate 150 was eliminated from the process by the hiring entity. The information tracked by recruiting management application 118 may be stored in prior post performance 116 of data store 114. Prior post performance 116 may include information in addition to that described above. As will be described below, prior post performance data 116 may be used to train a model and to determine probabilities associated with posting platforms 130 for each of a plurality of prior posts.

Recruiting management application 112 and posting application 114 may comprise elements of a suite of applications provided by platform 110. Each application in the suite may communicate with other applications of the suite via respective Application Programming Interfaces (APIs). For example, a user may access a landing Web page of the suite of applications, provide credentials, and then be presented with an interface allowing selection of, depending on the credentials, one or more of the applications of the suite.

Figure 2:
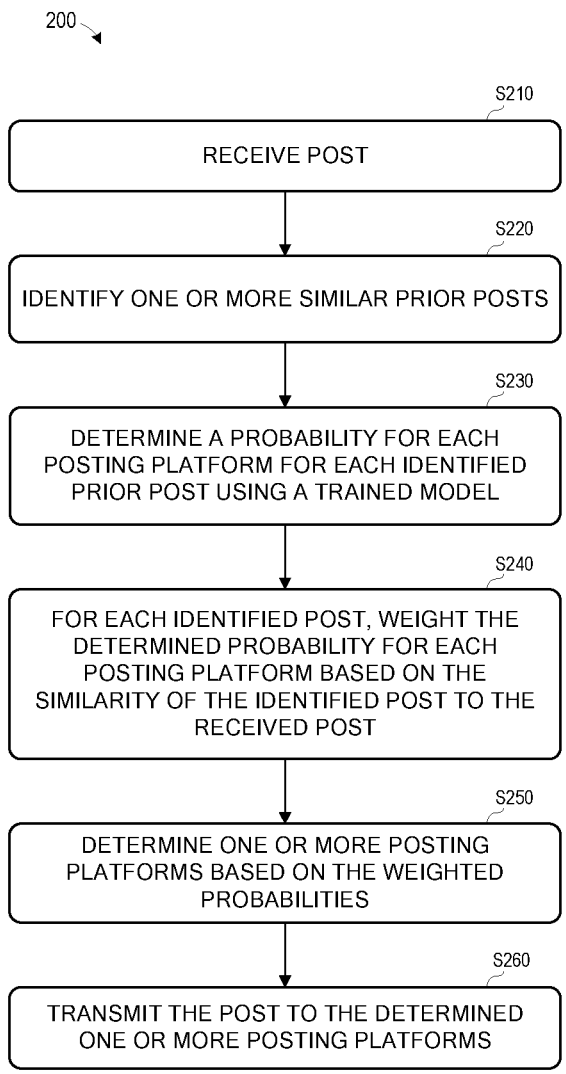
FIG. 2 is a flow diagram of a process to transmit a post to one or more recommended posting platforms according to some embodiments.

FIG. 2 comprises a flow diagram of a process to transmit a post to one or more recommended posting platforms according to some embodiments. Process 200 and all other processes mentioned herein may be embodied in processor-executable program code read from one or more of non-transitory computer-readable media, such as, for example, a hard disk drive, a volatile or non-volatile random access memory, a DVD-ROM, a Flash drive, and a magnetic tape, and then stored in a compressed, uncompiled and/or encrypted format. A processor may include any number of microprocessors, microprocessor cores, processing threads, or the like. In some embodiments, hard-wired circuitry may be used in place of, or in combination with, program code for implementation of processes according to some embodiments. Embodiments are therefore not limited to any specific combination of hardware and software.

A post is received at S210. According to some embodiments, the post is generated using user interfaces of a posting application such as posting application 112 and is received at S210 by a component of the posting application responsible for the selection of posting platforms to which the post should be transmitted. The post may comprise a job requisition and may include text. For purposes of the present example, the post includes text such as "Our company is actively searching for . . . "

One or more prior posts similar to the received post are determined at S220. The determination at S220 may include generating a numerical representation of the received post and comparing the numerical representation to numerical representations of prior posts for which post performance data such as post performance data 116 is available.

FIG. 3 depicts two prior posts for which post performance data is available. The posts are identified by an identifier and include text. According to some embodiments, the text of each post is input to a text vectorization algorithm (e.g. GPT2 by Google) to generate a set of vector coordinates for each post. FIG. 4 depicts the coordinates for each vector of each post depicted in FIG. 3 according to some embodiments. Each vector of the example consists of 300 dimensions, but embodiments are not limited thereto. According to some embodiments, the set of vector coordinates for a post is generated upon storage of the performance data for the post and stored therewith for future use.

Continuing with S220, the post received at S210 is also subjected to vectorization. For example, the coordinates $x_1$, $x_2$ and $x_{300}$ may be determined as 1.30, 0.43 and −0.91 for the received post. A distance between the vector of the received post and the vector of each prior post is then determined. In one example, the distance may be a Euclidean distance computed by summing the squares of the differences between the common coordinate values, and taking the square root of the sum. FIG. 5 illustrates the distances (i.e., 0.34, 0.91) between the received post and the prior posts represented in FIGS. 3 and 4.

It will be assumed that many prior posts are vectorized and compared to the received post at S220. FIG. 6 illustrates the five closest (i.e., associated with the smallest distance) posts to the received post which are identified at S220. Embodiments are not limited to identifying the five closest posts.

For each of the posts identified at S220, a probability is determined for each posting platform at S230. According to some embodiments, and as will be described in detail below, the probabilities for each post may be determined by inputting the vector coordinates of the post and post performance data to a trained machine learning model. The post performance data may include, for each particular step of a recruiting process, a number of candidates from each posting platform who reached the particular step.

FIG. 6 also illustrates the probabilities (for posting platforms $P_1$ and $P_2$) determined at S230 for each of the posts identified at S220. As described above with respect to the set of vector coordinates of each prior post, the probabilities associated with each prior post may be pre-generated and stored prior to S210.

Next, at S240 and for each identified post, the determined probabilities are weighted based on the similarity of the identified post to the received post. Also for each identified post, a score is determined at S250 for each posting platform based on the weighted probabilities. The following illustrates determination of a score associated with platform $P_1$.

$$S_{P1} = \frac{1}{0.09} * 0.76 + \frac{1}{0.27} * 0.08 + \frac{1}{0.15} * 0.64 + \frac{1}{0.36} * 0.18 + \frac{1}{0.35} * 0.72 = 15.56$$

As shown, the probability associated with post 328 and platform $P_1$ (i.e., 0.76) has been weighted by the distance between post 328 and the received post (i.e., 0.09). Weighted probabilities for each other identified post are similarly calculated and then summed to generate a score at S250.

The score generated at S250 is used to determine one or more posting platforms to which the received post should be transmitted at S260. For example, the posting platforms associated with the top three scores may determined at S250. In some embodiments, the score determined for each posting platform is presented to a user to assist selection by the user of posting platforms at S250. The score may be presented along with explanatory test as shown in FIG. 7.

The post is transmitted to the determined one or more posting platforms at S260. As described above, the posting platforms may make the post available to candidates, who may initiate a recruiting process associated with the post. The performance data of the post may be tracked in prior post performance 116 as also described above. Accordingly, the text of the post and probabilities associated therewith may be used in subsequent executions of process 300, and in training the machine learning model as will be described below.

Figure 8:
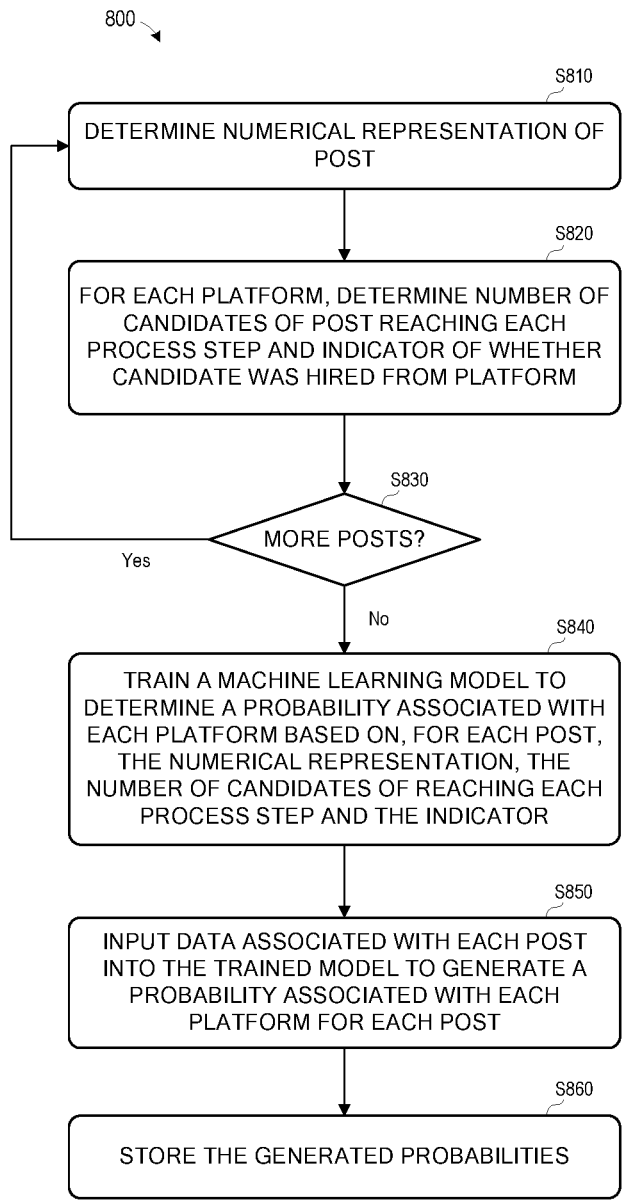
FIG. 8 is a flow diagram of a process to determine probabilities associated with posting platforms for each of a plurality of historical posts according to some embodiments.

FIG. 8 is a diagram of process 800 to determine probabilities associated with posting platforms for each of a plurality of prior posts according to some embodiments. In some embodiments, process 800 is executed once it is determined that sufficient number of prior posts exists to support training of a model based thereon. Process 800 may also be executed anytime it is desired to retrain a model based on new posts and on any desired combination of posts which were previously used to train a model. Such retraining would likely change the platform probabilities associated with each previously-used post, as will be evident from the description below.

A numerical representation of a post is determined at S810. As described above, the numerical representation may be determined using a text vectorization algorithm resulting in a set of coordinate values. Next, at S820, and for each posting platform and each process step, a number of candidates of the post who reached each process step is determined. Also determined at S820, again for each posting platform, is an indicator of whether an eventually-hired candidate used the posting platform to view, respond to, or otherwise interact with the post.

The number of candidates and the indicator may be stored in prior post performance 116 by recruiting management application 118. Recruiting management application 118 may therefore track, for each post, the number of candidates from each posting platform who proceed to each step of the recruiting process.

FIG. 9 is a tabular representation of a portion of prior post performance data 900 according to some embodiments. Each prior post (i.e., posts which were previously transmitted to one or more posting platforms) is identified by an ID. For each post, data includes vector coordinates representing the text of the post and a number of candidates associated with the post and each posting platform which proceeded to each of several steps of a recruiting process. For example, column P1-S1 indicates the number of candidates received from posting platform P1 who performed a first step (i.e., S1) of a recruiting process. Similarly, column P2-S2 indicates the number of candidates received from posting platform P2 who performed a second step (i.e., S2) of a recruiting process. It is noted that the number and nature of the steps associated with different posting platforms may differ. In the example of FIG. 9, a recruiting process for candidates received from posting platform P1 includes three steps, while a recruiting process for candidates received from posting platform P2 includes two steps.

For each post, data 900 also indicates a posting platform from which a candidate was hired. The flag "1" indicates that the hired candidate was received via the associated posting platform, while the flag "0" indicates that no hired candidate was received via the associated posting platform. In some embodiments, all flags in a given row may be '0' (i.e., no candidate was hired from any posting platform) or '1' (i.e., at least one candidate was hired from each posting platform).

At S830, it is determined whether additional posts exist for which data may be determined at S820. For example, S830 may consist of reviewing post performance data 116 to determine whether all prior posts listed therein have been processed at S810. Flow proceeds to S840 once a numerical representation, a number of candidates reaching each process step per posting platform, and an indicator of the hiring posting platform are determined for each post.

Figure 10:
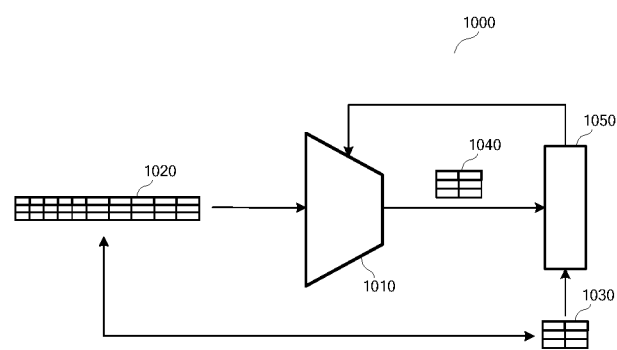
FIG. 10 illustrates training of a machine learning model according to some embodiments.

A machine learning model is trained at S840 to determine a probability associated with each posting platform. The training is based on the determined numerical representation, a number of candidates reaching each process step per posting platform, and indicator for each post. FIG. 10 depicts training of a machine learning model based on data such as data 900 according to some embodiments. Model 1010, and all other machine learning models described herein, may comprise a network of neurons (e.g., a neural network) which receive input, change internal state according to that input, and produce output depending on the input and internal state. The output of certain neurons is connected to the input of other neurons to form a directed and weighted graph. The weights as well as the functions that compute the internal state can be modified by a training process based on ground truth data.

Embodiments may comprise any one or more types of models that are or become known, including but not limited to convolutional neural network models, recurrent neural network models, long short-term memory network models, deep reservoir computing and deep echo state network models, deep belief network models, and deep stacking network models. Use of a multilayer model allows for complex non-linear relationships between input parameters and output probabilities.

As is known in the art, the structure of model 1010 is defined by hyperparameters and initial node weights. The hyperparameters and initial node weights are designed to receive a numerical representation of a post and numbers of candidates which reached various steps of a process for each of several posting platforms, and output probabilities for each of the several posting platforms. As shown in FIG. 10, model 1010 is trained based on data 1020 and 1030. Data 1020 may consist of the vector coordinates and the candidate numbers of data 900 and data 1030 may comprise the indicators of the last two columns of data 900. The indicators may be considered the "ground truth" data.

Training of model 1010 at S840 may consist of inputting a batch of rows of data 1020 to model 1010, and operating model 1010 to generate, for each row, probabilities 1040 for each posting platform. Loss layer 1050 determines a total loss based on a difference between probabilities 1040 and the actual probabilities 1030 associated with the input rows 1020. The total loss is back-propagated to model 1010 in order to modify parameters of model 1010 (e.g., using known stochastic gradient descent algorithms) in an attempt to minimize the total loss.

Model 1010 iteratively modified in the above manner, using a new batch of data 1020 at each iteration, until the total loss reaches acceptable levels or training otherwise terminates (e.g., due to time constraints or to the loss asymptotically approaching a lower bound). At this point, model 1010 is considered trained. Some embodiments may evaluate a performance of model 1010 based on testing data (e.g., data 1020 and 1030 which was not used to train model 1010) and re-train model 1010 differently (e.g., using different initialization, a different number of training steps, a different loss function, a different gradient descent implementation, etc.) if the performance is not satisfactory.

According to some embodiments, machine learning service 140 performs the above-described training based on instructions and training data (i.e., prior post performance data 116) received from posting application 112. Platform 110 may also or alternatively provide machine learning services to facilitate the training.

Returning to process 800, the data associated with each post is input to the trained model at S850 to generate a probability associated with each platform for each post. For example, the numerical representation and candidate numbers of each post are input to trained model 1010 at S850.

Figure 11:
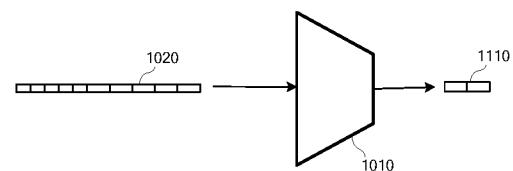
FIG. 11 illustrates inference of posting platform probabilities based on a post using a trained model according to some embodiments.

FIG. 11 depicts S850 according to some embodiments. A row of training data 1020 is input into trained model 1010, which operates as trained to output probabilities 1110. This process repeats for each other row 1020, each of which represents a post. FIG. 12 depicts data 1200 including the input data and the resulting platform-specific probabilities (i.e., in the last two columns of data 1200) generated at S850.

The generated probabilities are stored at S860. The generated probabilities may be stored in data store 114 in association with the posts to which they relate. The probabilities may also be stored in association with the numerical representation of the posts to which they relate. In this regard, data store 114 may store a data structure such as data 1200. The data of data structure 1200 may be used as described above to identify prior posts which are similar to a new post at S220 and to determine a probability for each posting platform for each identified similar prior post at S230.

FIG. 13 is a view of user interface (UI) 1300 presenting posting platform recommendations according to some embodiments. UI 1300 may be generated by posting application 112 and displayed on a computing device operated by manager 120 of FIG. 1.

UI 1300 presents three posting platforms determined based on weighted probabilities at S250 of process 200. Each posting platform is associated with a recommendation which may correspond to a score determined for each platform based on the weighted probabilities as described above.

Each platform is associated with a checkbox 1310 using which manager 120 may select one or more of the listed posting platforms. After selecting one or more desired posting platforms, selection of control 1320 causes the current post to be transmitted to the selected platforms at S260. Control 1330 may be selected to view a list of other posting platforms which can be selected to receive the post. The list of other posting platforms may include scores determined for each other posting platform, for example.

Figure 14:
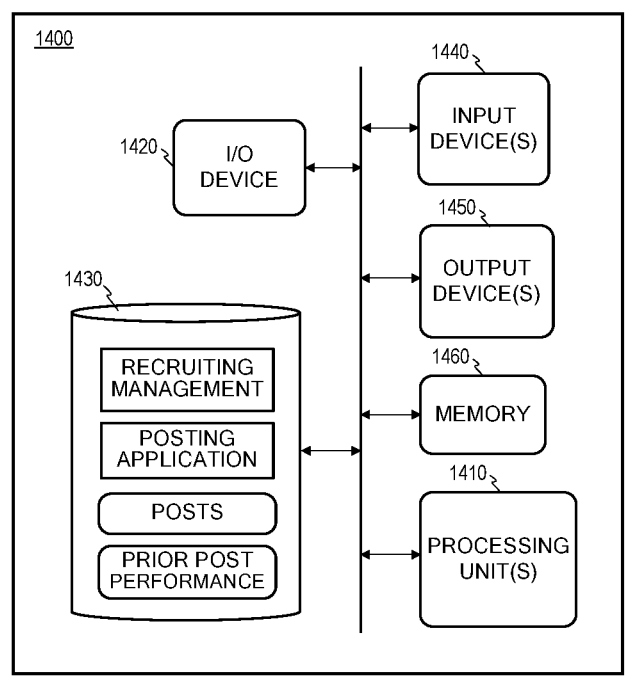
FIG. 14 is a block diagram of a hardware system providing an application for generating posts and recommending posting platforms according to some embodiments.

FIG. 14 is a block diagram of a hardware system according to some embodiments. Hardware system 1400 may comprise a computer server and may execute program code to perform any of the functions described herein. Hardware system 1400 may be implemented by a distributed cloud-based server, a virtual machine, or other implementation and may comprise an implementation of platform 110 in some embodiments. Hardware system 1400 may include other unshown elements according to some embodiments.

Hardware system 1400 includes processing unit(s) 1410 operatively coupled to I/O device 1420, data storage device 1430, one or more input devices 1440, one or more output devices 1450 and memory 1460. I/O device 1420 may facilitate communication with external devices, such as third-party posting platforms, an external network, the cloud, or a data storage device. Input device(s) 1440 may comprise, for example, a keyboard, a keypad, a mouse or other pointing device, a microphone, knob or a switch, an infra-red (IR) port, a docking station, and/or a touch screen. Input device(s) 1440 may be used, for example, to enter information into hardware system 1400. Output device(s) 1450 may comprise, for example, a display (e.g., a display screen) a speaker, and/or a printer.

Data storage device 1430 may comprise any appropriate persistent storage device, including combinations of magnetic storage devices (e.g., magnetic tape, hard disk drives and flash memory), optical storage devices, Read Only Memory (ROM) devices, and RAM devices, while memory 1460 may comprise a RAM device.

Data storage device 1430 stores program code executed by processing unit(s) 1410 to cause system 1400 to implement any of the components and execute any one or more of the processes described herein. Such program code may include a machine learning model training program to execute training of machine learning models based on data as described herein. Such execution may include definition of network hyperparameters, training datasets, loss functions, etc.

Embodiments are not limited to execution of these processes by a single computing device. Data storage device 1430 may also store data and other program code for providing additional functionality and/or which are necessary for operation of hardware system 1400, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code to cause the system to:
train a machine learning model to determine a probability associated with each of two or more posting platforms based on, for each of a plurality of posts, a first numerical representation of the text of the post, a number of candidates reaching each of a plurality of steps of a hiring process for each of the two or more posting platforms, and an indicator for each of the two or more posting platforms indicating whether a candidate was hired from the posting platform;

for each of the plurality of posts, input the first numerical representation of the text of the post and the number of candidates reaching each of the plurality of steps of a hiring process for each of the two or more posting platforms into the trained machine learning model to generate a probability associated with each posting platform;
receive a first post comprising text;
identify one or more prior posts similar to the first post from a plurality of prior posts based on the text of the first post and text of the plurality of prior posts;
determine the probabilities associated with each of two or more posting platforms which were generated for each of the identified one or more prior posts;
for each of the identified one or more posts, determine a weighted probability associated with each of two or more posting platforms based on a similarity of the identified post to the first post and the probabilities associated with each of the two or more posting platforms which were generated for the identified post;
determine one or more of the two or more posting platforms based on the weighted probabilities; and
transmit the first post to the determined one or more posting platforms.

2. The system according to claim 1, wherein determination of one or more of the two or more posting platforms comprises:
determination of a score for each posting platform of the two or more posting platforms based on the weighted probabilities associated with the posting platform; and
determination of the one or more of the two or more posting platforms based on the scores.

3. The system according to claim 2, wherein identification of one or more prior posts similar to the first post comprises: determination of a second numerical representation of the text of the first post and the first numerical representations of the text of the identified one or more posts; and determination of the similarity between the second numerical representation of the text of the first post and the first numerical representations of the text of each of the one or more identified posts.

4. The system according to claim 1, the processing unit to execute the processor-executable program code to cause the system to:
receive a second post comprising second text;
identify a second one or more prior posts similar to the second post from the plurality of prior posts and the first post based on the text of the second post and text of the plurality of prior posts and the first post;
determine, for each identified second one or more prior posts, probabilities associated with each of the two or more posting platforms;
for each of the identified second one or more posts, determine a second weighted probability associated with each of two or more posting platforms based on a similarity of the identified second post to the second post and the probabilities associated with each of two or more posting platforms for the post;
determine a second one or more of the two or more posting platforms based on the second weighted probabilities; and
transmit the second post to the determined second one or more posting platforms.

5. The system according to claim 4, wherein determination of one or more of the two or more posting platforms comprises:

determination of a score for each posting platform of the two or more posting platforms based on the weighted probabilities associated with the posting platform; and determination of the one or more of the two or more posting platforms based on the scores.

6. The system according to claim 1, the processing unit to execute the processor-executable program code to cause the system to:

receive a second post comprising second text;

identify a second one or more prior posts similar to the second post from the plurality of prior posts based on the text of the second post and text of the plurality of prior posts;

determine, for each identified second one or more prior posts, probabilities associated with each of the two or more posting platforms;

for each of the identified second one or more posts, determine a second weighted probability associated with each of two or more posting platforms based on a similarity of the second identified post to the second post and the probabilities associated with each of two or more posting platforms for the second identified post;

determine a second one or more of the two or more posting platforms based on the second weighted probabilities; and transmit the second post to the determined second one or more posting platforms.

7. A method comprising:

training a machine learning model to determine a probability associated with each of two or more posting platforms based on, for each of a plurality of posts, a first numerical representation of the text of the post, a number of candidates reaching each of a plurality of steps of a hiring process for each of the two or more posting platforms, and an indicator for each of the two or more posting platforms indicating whether a candidate was hired from the posting platform;

for each of the plurality of posts, inputting the first numerical representation of the text of the post and the number of candidates reaching each of the plurality of steps of a hiring process for each of the two or more posting platforms into the trained machine learning model to generate a probability associated with each posting platform;

receiving a first post comprising text;

identifying one or more prior posts similar to the first post from a plurality of prior posts based on the text of the first post and text of the plurality of prior posts;

determining the probabilities associated with each of the two or more posting platforms which were generated for each of the identified one or more prior posts;

for each of the identified one or more posts, determining a weighted probability associated with each of two or more posting platforms based on a similarity of the identified post to the first post and the probabilities associated with each of the two or more posting platforms which were generated for the identified post;

determining one or more of the two or more posting platforms based on the weighted probabilities; and displaying the determined one or more posting platforms to a user.

8. The method according to claim 7, wherein determining one or more of the two or more posting platforms comprises:

determining a score for each posting platform of the two or more posting platforms based on the weighted probabilities associated with the posting platform; and determining of the one or more of the two or more posting platforms based on the scores.

9. The method according to claim 8, wherein identifying one or more prior posts similar to the first post comprises: determining a second numerical representation of the text of the first post and the first numerical representations of the text of the one or more posts; and determining the similarity between the second numerical representation of the text of the first post and the first numerical representations of the text of each of the one or more posts.

10. The method according to claim 7, further comprising:

receiving a second post comprising second text;

identifying a second one or more prior posts similar to the second post from the plurality of prior posts and the first post based on the text of the second post and text of the plurality of prior posts and the first post;

determining, for each identified second one or more prior posts, probabilities associated with each of the two or more posting platforms;

for each of the identified second one or more posts, determining a second weighted probability associated with each of two or more posting platforms based on a similarity of the identified second post to the second post and the probabilities associated with each of two or more posting platforms for the identified second post;

determining a second one or more of the two or more posting platforms based on the second weighted probabilities; and presenting the second one or more posting platforms to the user.

11. The method according to claim 10, wherein determining one or more of the two or more posting platforms comprises:

determining a score for each posting platform of the two or more posting platforms based on the weighted probabilities associated with the posting platform; and determining the one or more of the two or more posting platforms based on the scores.

12. The method according to claim 7, further comprising:

receiving a second post comprising second text;

identifying a second one or more prior posts similar to the second post from the plurality of prior posts based on the text of the second post and text of the plurality of prior posts;

determining, for each identified second one or more prior posts, probabilities associated with each of the two or more posting platforms;

for each of the identified second one or more posts, determining a second weighted probability associated with each of two or more posting platforms based on a similarity of the identified second post to the second post and the probabilities associated with each of two or more posting platforms for the identified second post;

determining a second one or more of the two or more posting platforms based on the second weighted probabilities; and displaying the determined second one or more posting platforms to the user.

13. A non-transitory computer-readable medium storing program code executable by a processing unit to:

train a machine learning model to determine a probability associated with each of two or more posting platforms based on, for each of a plurality of posts, a first numerical representation of the text of the post, a number of candidates reaching each of a plurality of steps of a hiring process for each of the two or more posting platforms, and an indicator for each of the two or more posting platforms indicating whether a candidate was hired from the posting platform;

for each of the plurality of posts, input the first numerical representation of the text of the post and the number of candidates reaching each of the plurality of steps of a hiring process for each of the two or more posting platforms into the trained machine learning model to generate a probability associated with each posting platform;

receive a first post comprising text;

identify one or more prior posts similar to the first post from a plurality of prior posts based on the text of the first post and text of the plurality of prior posts;

determine the probabilities associated with each of two or more posting platforms which were generated for each of the identified one or more prior posts;

for each of the identified one or more posts, determine a weighted probability associated with each of two or more posting platforms based on a similarity of the identified post to the first post and the probabilities associated with each of the two or more posting platforms which were generated for the identified post;

determine one or more of the two or more posting platforms based on the weighted probabilities; and transmit the first post to the determined one or more posting platforms.

14. The medium according to claim 13, wherein determination of one or more of the two or more posting platforms comprises:
  determination of a score for each posting platform of the two or more posting platforms based on the weighted probabilities associated with the posting platform; and
  determination of the one or more of the two or more posting platforms based on the scores.

15. The medium according to claim 14, wherein identification of one or more prior posts similar to the first post comprises: determination of a second numerical representation of the text of the first post and the first numerical representations of the text of the one or more posts; and determination of the similarity between the second numerical representation of the text of the first post and the first numerical representations of the text of each of the one or more posts.

16. The medium according to claim 13, the program code executable by a processing unit to:
  receive a second post comprising second text;
  identify a second one or more prior posts similar to the second post from the plurality of prior posts and the first post based on the text of the second post and text of the plurality of prior posts and the first post;
  determine, for each identified second one or more prior posts, probabilities associated with each of the two or more posting platforms;
  for each of the identified second one or more posts, determine a second weighted probability associated with each of two or more posting platforms based on a similarity of the identified second post to the second post and the probabilities associated with each of two or more posting platforms for the identified second post;
  determine a second one or more of the two or more posting platforms based on the second weighted probabilities; and
  transmit the second post to the determined second one or more posting platforms.

17. The medium according to claim 13, the program code executable by a processing unit to:
  receive a second post comprising second text;
  identify a second one or more prior posts similar to the second post from the plurality of prior posts based on the text of the second post and text of the plurality of prior posts;
  determine, for each identified second one or more prior posts, probabilities associated with each of the two or more posting platforms;
  for each of the identified second one or more posts, determine a second weighted probability associated with each of two or more posting platforms based on a similarity of the identified second post to the second post and the probabilities associated with each of two or more posting platforms for the identified second post;
  determine a second one or more of the two or more posting platforms based on the second weighted probabilities; and
  transmit the second post to the determined second one or more posting platforms.

* * * * *